United States Patent Office.

CHARLES B. ORVIS, OF ST. LOUIS, MISSOURI, ASSIGNOR TO JOHN B. DAVIDSON, OF SAME PLACE.

*Letters Patent No. 69,118, dated September 24, 1867; antedated September 13, 1867.*

IMPROVEMENT IN TREATING BONE-BLACK FOR FILTERING SUGAR.

*The Schedule referred to in these Letters Patent and making part of the same.*

TO ALL WHOM IT MAY CONCERN:

Be it known that I, CHARLES B. ORVIS, of the city and county of St. Louis, and State of Missouri, have invented a new and useful Defecating Compound for Filtering Cane-Juice or other saccharine sirups; and I do hereby declare the following to be a full and exact description thereof.

My invention relates to a novel preparation of bone-black for defecating saccharine juices and sirups, and clearing the same of sedimentary and chemical impurities in such a manner as to greatly improve their crystallizing properties, and it is especially adapted to the preparation of sorghum-juice for granulation into sugar.

In using ordinary bone-black as a defecator with sorghum sirups, it becomes rapidly clogged with the impurities so as to require oft-repeated renewal. My invention obviates this difficulty, so that the bone-black may be used five or ten times as long, and at the same time obtain better results. It consists in the treatment and preparation of bone-black with sulphuric acid, and the use of this acidulated bone-black as a filtering compound, through which I pass the juice or sirup to be clarified. In preparing my acidulated bone-black for use I simply saturate the bone-black with a weak dilution of sulphuric acid, the proportion of acid to the bone-black being about one-half ounce of former to about two hundred pounds of the latter, water being added to the acid in sufficient quantity to obtain a solution capable of saturating the given quanty of bone-black. After saturation the bone-black is carefully dried, and is then ready for use. If old sirup is to be filtered through this compound it should be first diluted with water.

Having thus described my invention, what I claim as new, and desire to secure by Letters Patent, is—

The defecating composition prepared substantially as herein set forth.

CHAS. B. ORVIS.

Witnesses:
M. RANDOLPH,
CHAS. H. BOYLE.